(12) United States Patent
Liang et al.

(10) Patent No.: US 9,319,353 B2
(45) Date of Patent: Apr. 19, 2016

(54) NETWORK TASK OFFLOAD APPARATUS AND METHOD THEREOF

(75) Inventors: Li-Han Liang, Taipei (TW); Tao-Chun Wang, Taipei (TW); Kuo-Nan Yang, Hsinchu (TW); Shieh-Hsing Kuo, Taipei County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 760 days.

(21) Appl. No.: 12/491,219

(22) Filed: Jun. 24, 2009

(65) Prior Publication Data
US 2009/0327693 A1    Dec. 31, 2009

(30) Foreign Application Priority Data

Jun. 27, 2008   (TW) ............................. 97124301 A (51) Int. Cl.
*H04L 29/06*    (2006.01)
*H04K 1/00*     (2006.01)
*H04L 12/861*   (2013.01)
*G06F 21/62*    (2013.01)

(52) U.S. Cl.
CPC ............ *H04L 49/90* (2013.01); *H04L 49/9057* (2013.01); *H04L 63/0485* (2013.01); *G06F 21/6218* (2013.01); *G06F 2221/2107* (2013.01); *H04L 63/0428* (2013.01); *H04L 63/0442* (2013.01)

(58) Field of Classification Search
CPC ............ H04L 63/0428; H04L 63/0442; G06F 21/6218; G06F 2221/2107
USPC ........................ 713/152, 150, 165; 380/255
See application file for complete search history.

(56) References Cited

U.S. PATENT DOCUMENTS

| | | | |
|---|---|---|---|
| 6,725,371 B1 | 4/2004 | Verhoorn, III et al. | |
| 6,950,925 B1 | 9/2005 | Sander et al. | |
| 7,003,118 B1 | 2/2006 | Yang et al. | |
| 7,324,547 B1 | 1/2008 | Alfieri et al. | |
| 7,526,085 B1* | 4/2009 | Bong ............................. | 380/37 |
| 2004/0073716 A1 | 4/2004 | Boom et al. | |
| 2005/0135596 A1 | 6/2005 | Zhao | |
| 2005/0226238 A1 | 10/2005 | Hoskote et al. | |
| 2006/0056435 A1 | 3/2006 | Biran et al. | |

FOREIGN PATENT DOCUMENTS

CN    1809058    7/2006

OTHER PUBLICATIONS

Multiple Papers; Intel Technology Journal vol. 6 Iss. 3; Aug. 15, 2002. pp. 1-93 as printed.*

(Continued)

*Primary Examiner* — Aravind Moorthy
(74) *Attorney, Agent, or Firm* — McClure, Qualey & Rodack, LLP (57) ABSTRACT

A network task offload apparatus includes an offload circuit and a buffer scheduler. The offload circuit performs corresponding network task processing on a plurality of packets in parallel according to an offload command. The buffer scheduler includes a buffer control unit and a plurality of buffer units. The plurality of buffer units are controlled by the buffer control unit and are scheduled to store the processed packets.

16 Claims, 6 Drawing Sheets

(56) References Cited

OTHER PUBLICATIONS

No stated author; Intel IXP425 Network Processor—product brief; 2006; Retrieved from the Internet <URL: download.intel.com/design/network/ProdBrf/27905105.pdf>; pp. 1-4.*

No stated author; Intel IXP400 Software—Programmer's Guide; Nov. 2004; Retrieved from the Internet <URL: intel.com/content/dam/www/public/us/en/documents/guides/ixp400-software-v1-5-guide.pdf>; pp. 1-330 as printed.*

Hasan et al.; Efficient Use of Memory Bandwidth to Improve Network Processor Throughput; 2003; Retrieved from the Internet <URL: engineering.purdue.edu/~vijay/papers/2003/np.pdf>; pp. 1-12 as printed.*

Ravi et al.; Security in Embedded Systems: Design Challenges; Aug. 2004; Retrieved from the Internet <URL: http://dl.acm.org/citation.cfm?id=1015049>; pp. 1-31 as printed.*

English Abstract translation of CN1809058 (Published Jul. 26, 2006).

* cited by examiner

NETWORK TASK OFFLOAD APPARATUS AND METHOD THEREOF

BACKGROUND OF THE INVENTION

1. Field of the Invention

The present invention relates to network communication, and more particularly to a network task offload.

2. Description of the Prior Art

The conventional network device, such as a network interface card, enables computers or other devices to communicate with other devices or computers through a wired network or a wireless network, and there are many related network tasks required to be executed during the communication. For example, the executed network task may include network security protection, checksum verification, etc. However, these tasks usually cost a large amount of computing power of CPU.

In order to decrease a CPU's computing load on processing network tasks, hardware can be used to support part of the network tasks. This is called hardware offload or network task offload. However, how to use hardware to handle complicated network tasks is also a big issue.

SUMMARY OF THE INVENTION

One of the objectives of the present invention is to provide a network task offload apparatus and method thereof, thereby increasing the network task offload's efficiency greatly.

One exemplary embodiment of the present invention discloses a network task offload apparatus which comprises an offload circuit and a buffer scheduler. The offload circuit performs corresponding network task processing on a plurality of packets in parallel according to an offload command, and generating a plurality of processed pockets. The buffer scheduler is coupled to the offload circuit and comprises a plurality of buffer units for temporarily storing the processed packets, respectively, wherein the buffer units are scheduled to temporarily store the processed packets.

These and other objectives of the present invention will no doubt become obvious to those of ordinary skill in the art after reading the following detailed description of the preferred embodiment that is illustrated in the various Figures and drawings.

DETAILED DESCRIPTION

Figure 1:
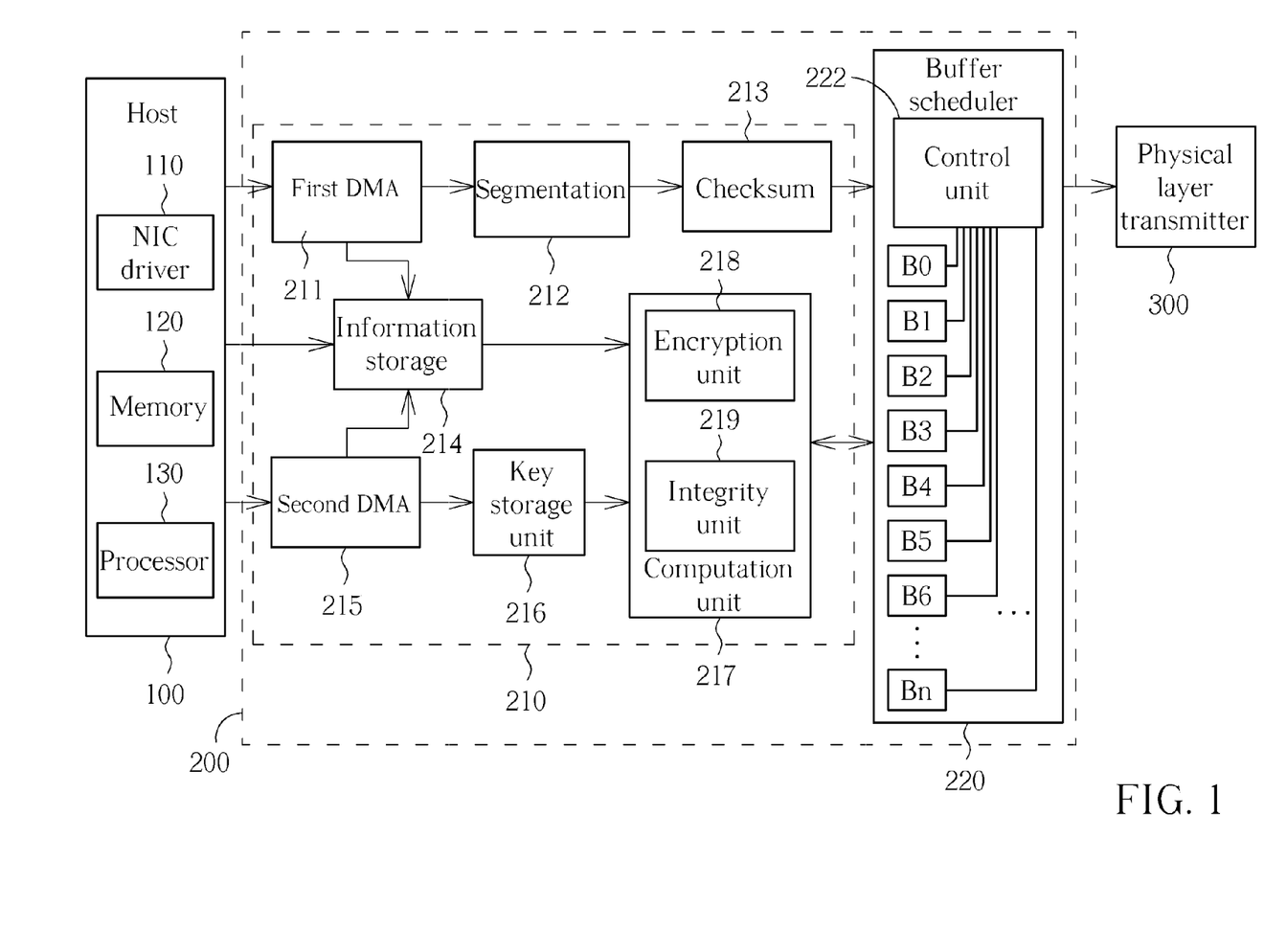
FIG. 1 is a block diagram of a network task offload apparatus applied to a network transmitting node according to one exemplary embodiment of the preset invention.

Please notice that FIG. 1 only shows elements related to technical features of the present invention for the sake of brevity. The host 100 in FIG. 1 can be any device able to communicate with another device through a wired network or a wireless network, such as PC, notebook, PDA, or a mobile communication device. In this embodiment, the host 100 comprises a network interface controller (NIC) driver 110, a memory 120 and a processor 130. The network offload apparatus 200 can be implemented using a chip. The apparatus 200 comprises an offload circuit 210 and a buffer scheduler 220, where the offload circuit 210 performs corresponding network tasks on a plurality of packets in parallel according to an offload command from the host 100 to thereby decrease the computing load of the processor 130 on network tasks. The buffer scheduler 220 stores a plurality of packets and controls access of the plurality of packets. Besides, the physical layer transmitter 300 is to transmit packets which have been processed.

The offload circuit 210 comprises a first direct memory access (DMA) 211, a segmentation 212 (e.g. TCP segmentation), a checksum 213, an information storage unit 214, a second DMA 215, a key storage unit 216, and a computation unit 217. In addition, the computation unit 217 comprises an encryption unit 218 and an integrity unit 219. The buffer scheduler 220 comprises a control unit 222 and buffers B0, B1, B2, B3, . . . , Bn. The checksum 213 performs checksum operation on the packets and then adds the derived checksums to the packets. The control unit 222 controls access of the buffers B0-Bn.

In order to decrease the load of the processor 130, the driver 110 sends an offload command to the offload circuit 210 to control the offload circuit 210 to execute corresponding network task offload on the packets to be transmitted, such as encryption, integrity check, checksum, etc. The information storage unit 214 stores the offload task information of the offload operation that should be applied to the packets, the address of the packets in the memory 120, etc. according to the offload command. In this embodiment, regarding the processing of a packet, the offload circuit 210 has to perform a direct memory access, checksum, transport-layer encryption, transport-layer integrity check, network-layer encryption, network-layer integrity check, data-link layer encryption and data-link layer integrity check sequentially. Next, the PHY layer transmitter 300 is allowed to transmit the processed packet.

Figure 2:
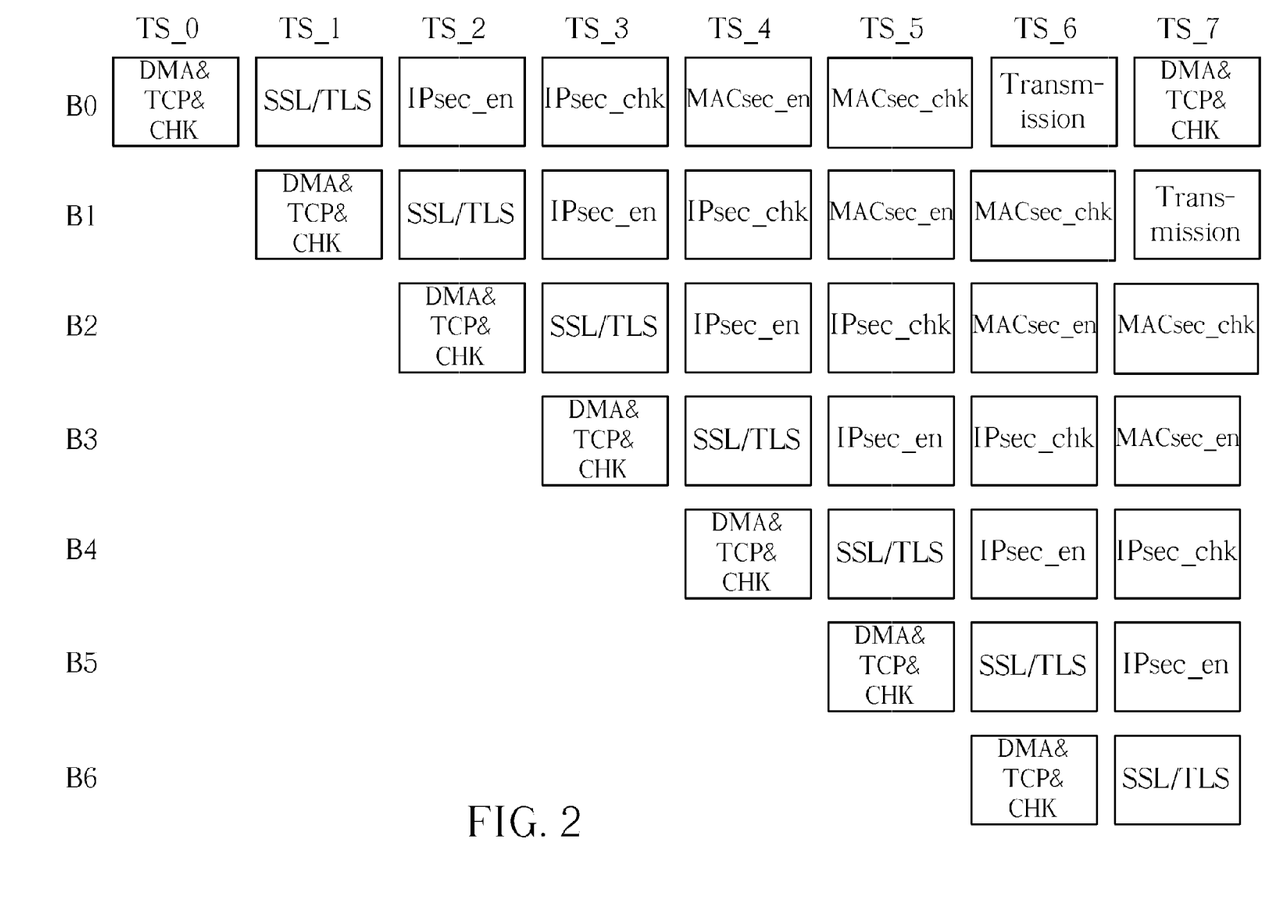
FIG. 2 is a diagram illustrating tasks that the network task offload apparatus in FIG. 1 executes on data stored in each buffer unit.

The horizontal axis in FIG. 2 represents time, the vertical axis represents each buffer unit, and the blocks represent the network tasks applied to packets stored in each buffer unit. In time slot TS_0, the first DMA 211 accesses a first packet which is supposed to be offloaded from the memory 120 according to information stored in the information storage unit 214. The segmentation 212 performs a transmission control protocol (TCP) segmentation (referred to as TCP). The checksum 213 performs related checksum operation on the first packet, such as filling a checksum in the corresponding field in the first packet after the checksum is derived (referred to as CHK), and then sending the first packet to the buffer scheduler 220. The buffer scheduler 220 stores the first packet in the buffer B0. Please notice that, in time slot TS_0, the offload circuit 210 is allowed to directly save the first packet into the buffer unit B0 from the host without performing the TCP segmentation and checksum operation. Later, the offload circuit 210 performs the TCP segmentation and checksum operation in the other time slot(s).

Figure 3:
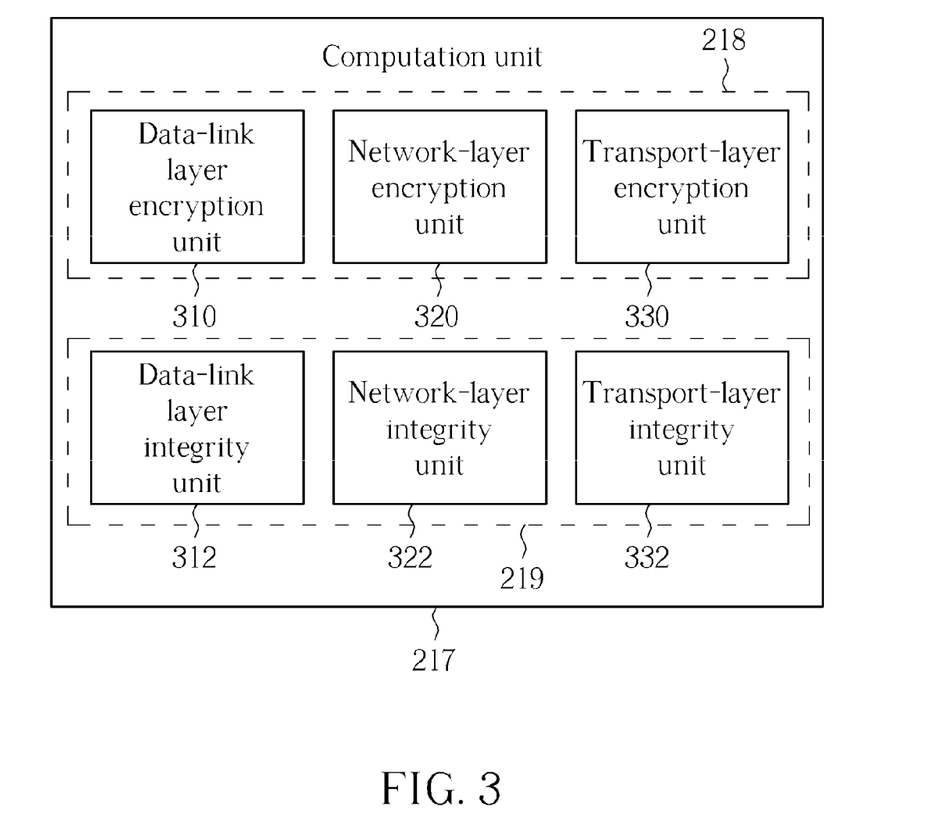
FIG. 3 is a detailed diagram of one embodiment of a computation unit shown in FIG. 1.

FIG. 3 is a detailed diagram of one embodiment of the computation unit 217 shown in FIG. 1. The computation unit 217 comprises a data-link layer encryption unit 310, a data-link layer integrity unit 312, a network-layer encryption unit 320, a network-layer integrity unit 322, a transport-layer encryption unit 330, and a transport-layer integrity unit 332. In time slot TS_1, the second DMA 215 directly accesses an encryption key which is for encrypting the first packet from the memory 120 according to information stored in the information storage unit 214, and stores the first encryption key in the key storage unit 216. The transport layer encryption unit 330 reads the first packet from the buffer unit B0 according to information stored in the information storage unit 214, and uses the first encryption key to encrypt the first packet, such as performing an SSL/TLS encrypting. The checksum 213 generates a checksum of the first packet, filling it in the corresponding field in the first packet, and then saving the first packet back to the buffer B0. After that, the first DMA 211 directly accesses a second packet supposed to be offloaded from the memory 120. The segmentation 212 performs the TCP segmentation on the second packet, and the checksum 213 performs related checksum operation on the second packet, and then sends the second packet to the buffer B1 of the buffer scheduler 220.

In time slot TS_2, the second DMA 215 accesses the first network-layer encryption key which is for encrypting the first packet from the memory 120 according to information stored in the data register 214 (information storage unit 214), and stores the first network-layer encryption key in the key register 216 (key storage unit 216. The network-layer encryption unit 320 reads the first packet from the buffer B0 according to information stored in the data register 214, uses the first network-layer encryption key to encrypt the first packet, such as performing a network-layer IP security encryption (referred to as IPsec_en), and then saves the first packet back to the buffer unit B0. The second direct access unit 215 directly accesses the second transport-layer encryption key which is for encrypting the second packet from the memory 120 according to information stored in the data register 214 and stores the second transport-layer encryption key in the key register 216. The transport-layer encryption unit 330 reads the second packet from the buffer unit B1 according to information stored in the data register 214, uses the second transport-layer encryption key to encrypt the second packet by SSL/TLS encryption, and then saves the second packet back to the buffer unit B1. The first direct access unit 211 directly access a third packet which are supposed to be offloaded from the memory 120. The segmentation unit 212 performs the TCP segmentation on the third packet, and the checksum unit 213 performs related checksum operation on the third packet, and then sends the third packet to the buffer scheduler 220. The buffer scheduler 220 stores the third packet in the buffer B2.

As mentioned above, the apparatus 200 of the present invention is capable of performing corresponding network task processing on a plurality of packets in parallel and at the same time. For example, in time slot TS_2, the network task offload apparatus 200 performs the IP security encryption on the first packet, SSL/TLS encryption on the second packet, and the DMA on the third packet. Hence a more efficient network task offload can work while transmitting packets.

Similar to time slots TS_0 to TS_2, in time slots TS_3, TS_4 and T5_5, the network layer integrity unit 322, the data-link layer encryption unit 310 and the data-link layer integrity unit 312 read out the first packet from the buffer unit B0 according to the offload command, perform the network layer integrity operation, such as the network layer integrity check value operation (referred to as IPsec_chk), data-link layer encryption, such as data-link layer MAC security encryption (referred to as MACsec_en) and data-link layer integrity check value operation (referred to as MACsec_chk), and save the first packet back to the buffer unit B0. In time slot TS_6, the physical layer transmitter 300 transmits the processed first packet. As remaining packets are processed using a method similar to that applied to the first packet, further description is omitted here for the sake of brevity.

Figure 4:
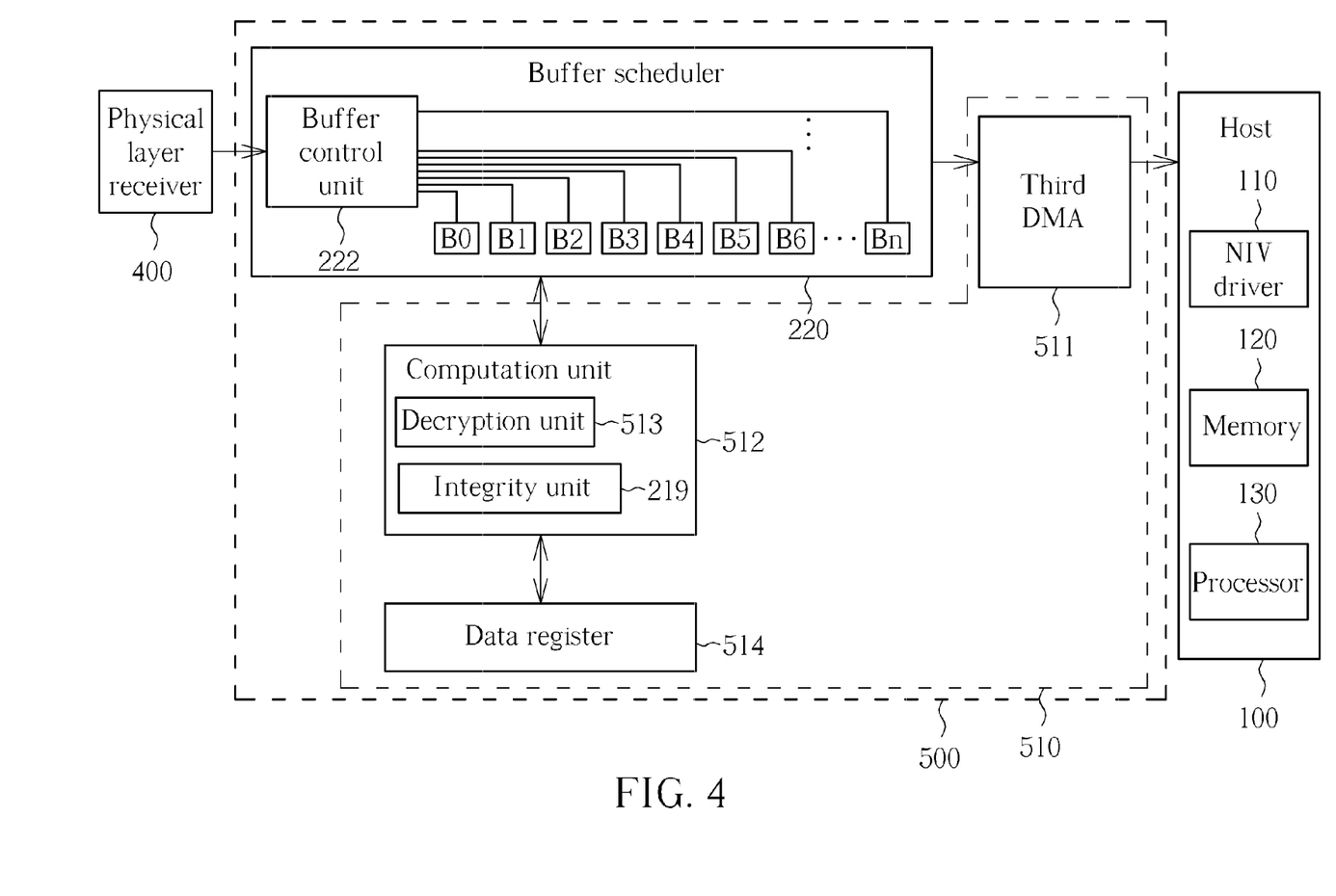
FIG. 4 is a block diagram of a network task offload apparatus applied to a network receiving node according to one exemplary embodiment of the present invention.

FIG. 4 is a block diagram illustrating a network task offload apparatus applied to a network receiving node according to an exemplary embodiment of the present invention. Please notice that FIG. 4 only shows elements related to technical features of the present invention for the sake of brevity. Besides, the elements with the same reference number in FIG. 4 and FIG. 1 are configured to perform the same or similar function. Therefore, further description is omitted for the sake of brevity. In this embodiment, the exemplary network task offload apparatus 500 comprises an offload circuit 510 and a buffer scheduler 220. The offload circuit 510 performs corresponding network task processing on a plurality of packets in parallel according to an offload command in order to decrease the computing load of the processor 130 in the host 100 on processing network task. The buffer scheduler 220 stores a plurality of packets and controls the access of the plurality of packets. Besides, the physical layer receiver 400 is implemented to receive packets to be processed.

The offload circuit 510 comprises a third direct access memory unit 511 (referred to as third DMA 511 hereinafter), a data register 514 and a computation unit 512 which comprises a decryption unit 513 and an integrity unit 219. The buffer scheduler 220 is coupled to the offload circuit 510.

Similarly, in order to decrease the computing load of the processor 130 on processing network tasks while receiving packets, the offload circuit 510 performs corresponding network task offload on the received packets, such as decryption, integrity check, checksum verification, etc. The data register 514 stores information needed for parsing packets. In this embodiment, regarding the processing of a packet, the offload circuit 510 performs a direct memory access, data-link layer integrity check, data-link layer decryption, network-layer integrity check, network-layer decryption, transport-layer decryption and transport-layer integrity check sequentially. Next, the third DMA 511 sends the processed packet to the host 100.

Figure 5:
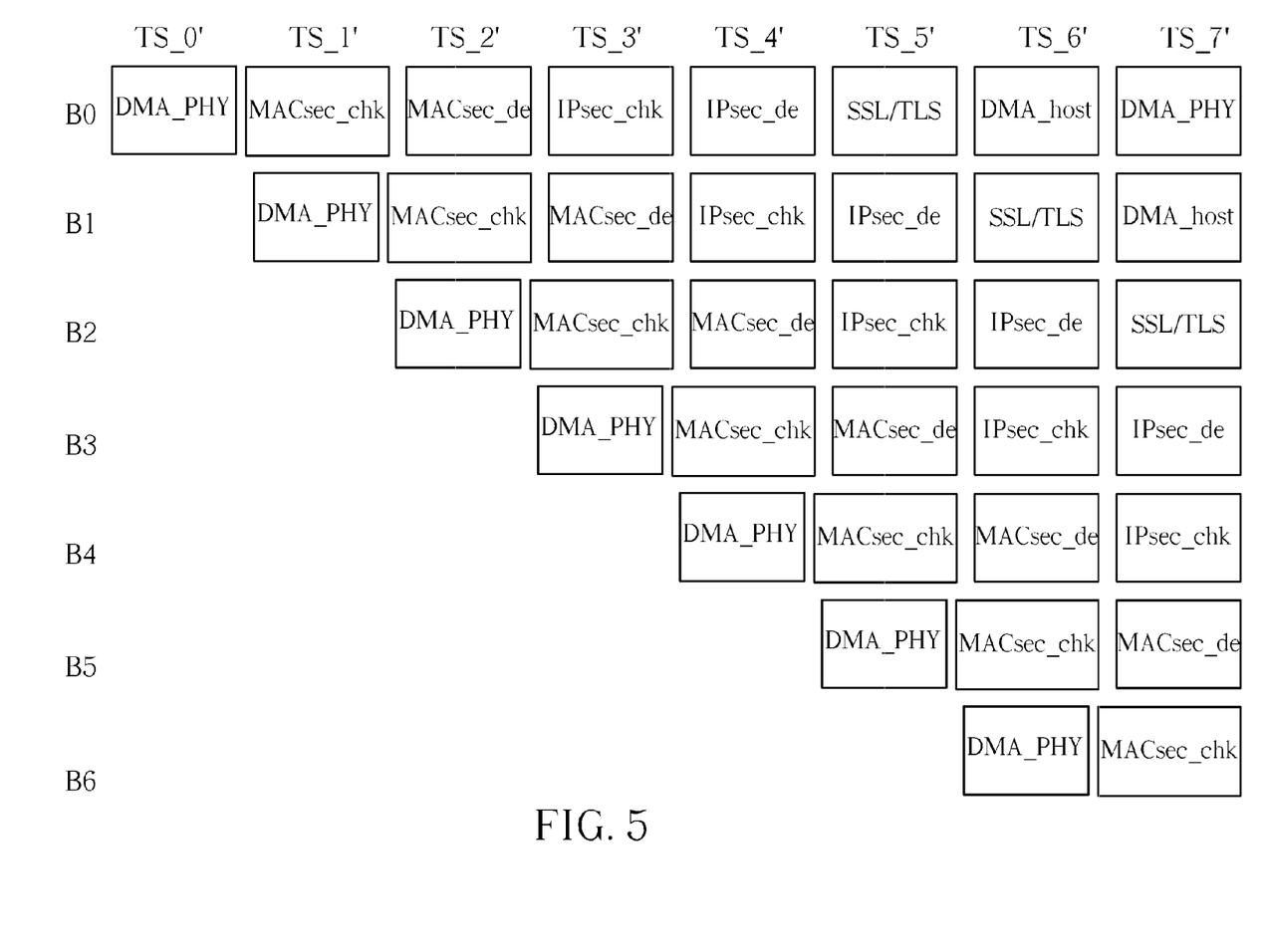
FIG. 5 is a diagram illustrating tasks that the network task offload apparatus in FIG. 4 executes on data stored in each buffer unit.
Figure 6:
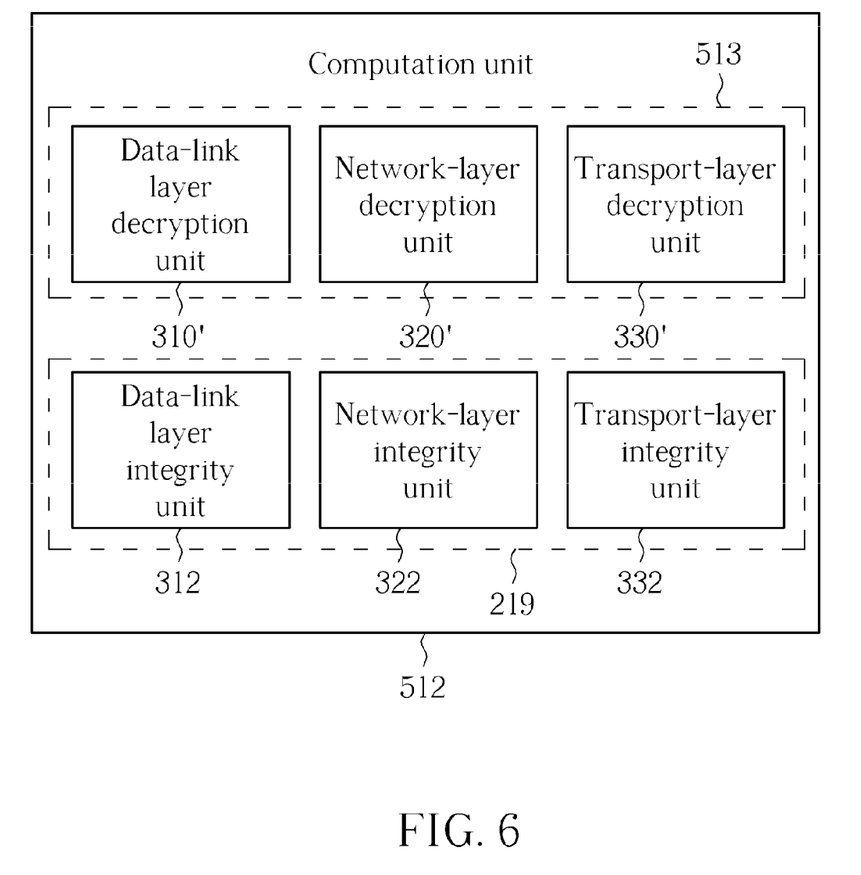
FIG. 6 is a detailed diagram of one embodiment of a computation unit shown in FIG. 4.

FIG. 5 is a diagram illustrating tasks that the network task offload apparatus 500 in FIG. 4 executes on data stored in each buffer unit. The horizontal axis in FIG. 5 represents time, the vertical axis represents each buffer unit and the blocks represent the network tasks applied to packets stored in each buffer unit. FIG. 6 is a detailed diagram of one embodiment of the computation unit 512 shown in FIG. 4. The computation unit 512 comprises a data-link layer decryption unit 310', a data-link layer integrity unit 312, a network-layer decryption unit 320', a network-layer integrity unit 322, a transport-layer decryption unit 330' and a transport-layer integrity unit 332.

In time slot TS_0', the offload apparatus 500 directly stores a first packet from the physical layer receiver 400 to the buffer unit B0 (referred to as DMA_PHY). In time slot TS_1' to TS_5', the data-link layer integrity unit 312, the data-link layer decryption unit 310', the network layer integrity unit 322, the network layer decryption unit 320' and the transport layer decryption unit 330' read out the first packet from the buffer unit B0 according to an offload command, perform MACsec_chk, MACsec decryption (referred to as MACsec_de), IPsec_chk, IPsec decryption (referred to as IPsec_de), SSL/TLS decryption (referred to as SS/TLS), SSL/TLS integrity verification respectively, and then save the first packet back to the buffer unit B0. In time slot TS_6', the third direct access unit 511 directly stores the settled first packet to the memory 120 (referred to as DMA host). In time slot TS_1' to TS_7', the similar operation is performed on a second packet. As remaining packets are processed using a method similar to that mentioned above, further description is omitted here for the sake of brevity.

As mentioned above, the network task offload apparatus 500 is capable of performing corresponding network task processing on a plurality of packets in parallel. For example, in time slot TS_2', the network task offload apparatus 500 performs MACsec_de on the first packet, MACsec_chk on the second packet and DMA on the third packet. Hence a more efficient network task offload can work while receiving packets.

Briefly summarized, the exemplary embodiment of the present invention provides an apparatus and a method employing a network task offload technique which performs corresponding network task processing on a plurality of packets in parallel to thereby achieve an optimized performance of the network task offload by means of a pipeline architecture.

Those skilled in the art will readily observe that numerous modifications and alterations of the device and method may be made while retaining the teachings of the invention.

What is claimed is:

1. A network task offload apparatus, comprising:
   an offload circuit, for sequentially receiving a plurality of packets from a host and for simultaneously performing different network processing tasks on each of the plurality of packets in parallel according to an offload command from the host; and
   a buffer scheduler, coupled to the offload circuit, comprising:
      a plurality of buffer units, for temporarily storing the plurality of packets during at least a time between time slots when the offload circuit performs the different network processing tasks, respectively, wherein each of the plurality of buffer units is used for temporary storage of a respective packet among the plurality of packets for all of the times between the time slots for the different processing tasks corresponding to the respective packet, and for providing the respective processed packet to a transmitter for transmission to a network;
   wherein the offload circuit comprises an encryption unit, the encryption unit simultaneously performing the different network processing tasks by simultaneously performing encryption tasks on each of the plurality of packets; and
   wherein the encryption unit comprises at least one each of a data-link layer encryption unit, a network-layer encryption unit, and a transport-layer encryption unit, wherein the encryption unit repeatedly access a first buffer unit of the plurality of buffer units between the time slots to perform a transport-layer encryption for the first packet during a first time slot of the time slots, followed by a network-layer encryption for the first packet during a second time slot of the time slots, followed by a data-link layer encryption for the first packet during a third time slot of the time slots.

2. The apparatus of claim 1, wherein the offload circuit comprises a segmentation unit.

3. The apparatus of claim 1, wherein the offload circuit comprises a direct memory access unit and a checksum unit.

4. A method applied in a network device, the method comprising:
   sequentially receiving a plurality of packets from a host;
   simultaneously performing different network processing tasks on each of the plurality of packets in parallel according to an offload command from a host, wherein the different network processing tasks are performed at a plurality of predetermined time slots;
   providing a plurality of buffer units for temporarily storing the plurality of packets during at least a time between the predetermined time slots, respectively, each of the plurality of buffer units used for temporarily storing a respective packet among the plurality of packets for all of the times between the predetermined time slots for the different processing tasks corresponding to the respective packet, and
   providing the respective packet as a processed packet to a transmitter for transmission on a network,
   wherein the performing further comprises repeatedly accessing a first buffer unit of the plurality of buffer units between at least first, second, and third predetermined time slots among the predetermined time slots and performing a transport-layer encryption for the first packet during the first predetermined time slot followed by a network-layer encryption for the first packet during the second predetermined time slot followed by a data-link layer encryption for the first packet during the predetermined third time slot.

5. The method of claim 4, wherein the different network processing tasks comprise a plurality of corresponding decryption tasks.

6. The method of claim 5, wherein the corresponding decryption tasks comprise at least one of a data-link layer decryption task, a network-layer decryption task, and a transport-layer decryption task.

7. The method of claim 4, wherein the different network processing tasks comprise at least one corresponding integrity check task.

8. The method of claim 7, wherein the at least one corresponding integrity check task comprises at least one of a data-link layer integrity check task, a network-layer integrity check task, and a transport-layer integrity check task.

9. The method of claim 4, wherein the different network processing tasks comprise at least a segmentation task.

10. The method of claim 9, wherein the segmentation task comprises a transmission control protocol (TCP) segmentation task.

11. The method of claim 4, wherein the different network processing tasks comprise at least a direct memory access operation, a segmentation task, and a checksum operation task.

12. A network task offload apparatus, comprising:
   an offload circuit for sequentially receiving a plurality of packets from a host and for simultaneously performing network processing tasks on each of the plurality of packets according to an offload command from the host, wherein the offload circuit performs the network processing tasks during predetermined time slots; and
   a buffer scheduler coupled to the offload circuit, the buffer scheduler comprising:
      a plurality of buffer units for temporarily storing the plurality of packets, wherein each of the plurality of buffer units is used for temporary storage of a respective packet among the plurality of packets for all of the times between the predetermined time slots for the different processing tasks corresponding to the respective packet, and
      a control unit for determining when the buffer units temporarily store the plurality of packets, and for providing a respective processed packet for transmission to a network when the offload circuit performs a final network processing task on a respective packet, wherein the offload circuit comprises an encryption unit, the encryption unit simultaneously performing the different network processing tasks by simultaneously performing encryption tasks on each of the plurality of packets, the encryption unit comprising at least one each of a data-link layer encryption unit, a network-layer encryption unit, and a transport-layer encryption unit, wherein the encryption unit repeatedly accesses a first buffer unit of the plurality of buffer units between at least first, second, and third predetermined time slots among the predetermined time slots to perform a transport-layer encryption for the first packet during the first predetermined time slot followed by a network-layer encryption for the first packet during the second predetermined time slot followed by a data-link layer encryption for the first packet during the third time slot of the time slots.

13. The apparatus of claim 12, wherein the offload circuit comprises:

a decryption unit, for sequentially performing a corresponding decryption task on at least one packet of the packets according to the offload command.

14. The apparatus of claim 13, wherein the decryption unit comprises at least one of a data-link layer decryption unit, a network-layer decryption unit, and a transport-layer decryption unit.

15. The apparatus of claim 12, wherein the offload circuit comprises:

an integrity unit, for sequentially performing a corresponding integrity check task on at least one packet of the packets according to the offload command.

16. The apparatus of claim 15, wherein the integrity unit comprises at least one of a data-link layer integrity unit, a network-layer integrity unit, and a transport-layer integrity unit.

* * * * *